May 13, 1958 A. H. KING 2,834,219
FLUID TRANSMISSION UNIT
Filed Nov. 13, 1953
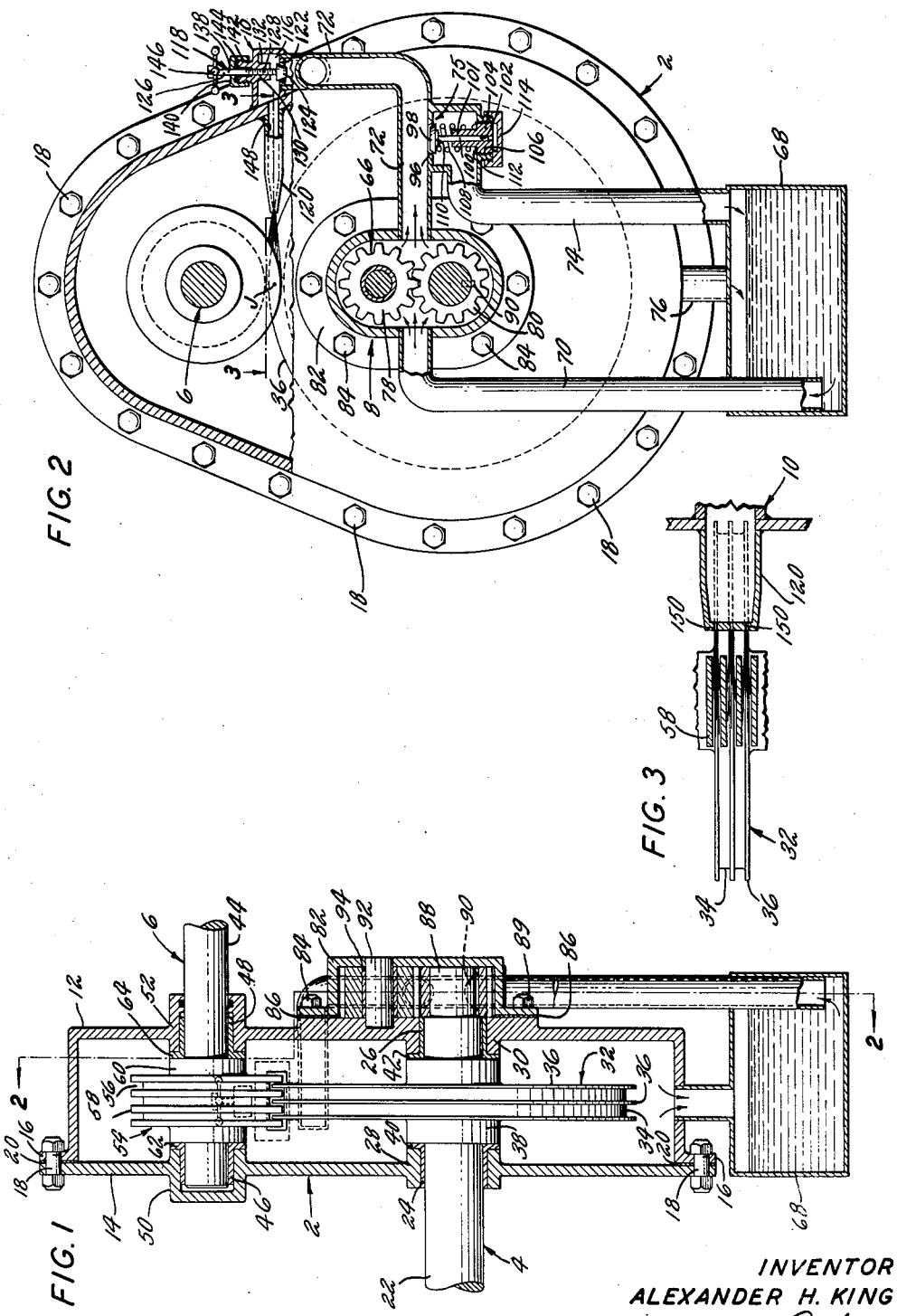
INVENTOR
ALEXANDER H. KING
BY Jack N. McCarthy
AGENT

2,834,219

FLUID TRANSMISSION UNIT

Alexander H. King, West Hartford, Conn., assignor to United Aircraft Corporation, East Hartford, Conn., a corporation of Delaware Application November 13, 1953, Serial No. 391,790

8 Claims. (Cl. 74—206)

This invention relates to a drive of the fluid type adapted to be used as a transmission between a driving shaft and a driven shaft.

An object of this invention is to provide a transmission which will transmit motion from one shaft to another smoothly and uniformly with no torsional vibration or shock such as caused by small unavoidable inaccuracies in gear teeth.

Another object of this invention is to provide a transmission which will transmit motion from one shaft to another without having a positive connection between the two shafts.

A further object of this invention is to provide a transmission which will not transmit to the driven shaft sudden changes in speed of the driving shaft. This is especially advantageous where delicate instruments are driven and a sudden change in the drive may result in a failure of the instruments.

Another object of this invention is to provide a transmission unit for use between a device having a driving mechanism and a device having a mechanism to be driven.

Further objects and advantages will be apparent from the specification and drawings.

Fig. 1 is a longitudinal sectional view showing a fluid drive embodying the present invention.

Fig. 2 is a view partially in section taken along the line 2—2 of Fig. 1.

Fig. 3 is a sectional view showing the multiple nozzle taken on the line 3—3 of Fig. 2.

With reference to Figs. 1 and 2, this embodiment of the invention consists of five main parts: (a) the first part comprises a fixed housing 2, (b) the second part comprises a driving shaft assembly 4, (c) the third part comprises a driven shaft assembly 6, (d) the fourth part comprises a pump assembly 8, and (e) the fifth part comprises a nozzle assembly 10.

The housing 2 is made up of a body section 12 and a cover 14. Body portion 12 has a flange 16 extending around its outer edge, cover 14 is fixed to said flange by a plurality of bolts 18. A gasket 20 is placed between the sealing surface of flange 16 and cover 14 to prevent any operating fluid from leaking out of the housing 2.

The driving assembly 4 and driven assembly 6 are rotatably mounted in the housing 2. A driving shaft 22 of the driving assembly 4 has a portion journaled in plain bearings 24 and 26 in said housing. Bearing 24 is fixed within a boss 28 on the cover 14 and bearing 26 is fixed within a boss 30 on the body 12. A driving wheel 32 is fixed to said driving shaft 22 within said housing. Driving wheel 32, which comprises a drum 34 having a plurality of circular flanges 36 extending radially therefrom, has a hub 38 which is fixedly mounted to driving shaft 22, by any means desired, between thrust bearings 40 and 42. In the construction shown, the plain bearing 24 and the thrust bearing 40 are formed from a single member. Plain bearing 26 and thrust bearing 42 are similarly formed.

A driven shaft 44 of the driven assembly 6 has a portion journaled in plain bearings 46 and 48 in said housing. Bearing 46 is fixed within a boss 50 on the cover 14 and the bearing 48 is fixed within a boss 52 on the body 12. A driven wheel 54 is fixed to said driven shaft 44 within said housing, Driven wheel 54, which comprises a drum 56 having a plurality of circular flanges 58 extending radially therefrom, has a hub 60 which is fixedly mounted to driven shaft 44, by any means desired, between thrust bearings 62 and 64. In the construction shown, the plain bearing 46 and the thrust bearing 62 are formed from a single member. Plain bearing 48 and thrust bearing 64 are similarly formed.

The radial circular flanges 36 of driving wheel 32 intermesh with the radial circular flanges 58 of the driven wheel 54. As can be seen from Figure 1, the flanges on each of the wheels are equally spaced and overlap in an alternating manner. The four flanges 58 of the driven wheel form three grooves to receive the three flanges 36 of the driving wheel.

While the wheels 32 and 54 have been described as comprising a drum having a plurality of circular flanges extending radially therefrom, they may be constructed in other manners. For example, the wheel may be built up of alternating large and small discs providing the correct flange depth and groove width.

The pump assembly 8 comprises a gear pump 66, a sump 68, a passageway 70 connecting said sump to the inlet of said pump, and outlet passageway 72 connected to the outlet of said pump, a return passageway 74 connecting the outlet of said pump to said sump, a pressure relief by-pass valve 75 located in said passageway 74 between the outlet of said pump and said sump, and a return passageway 76 which connects the interior of said housing to said sump.

The pump 66 is of the gear type and it has two gears 79 and 80 mounted in a cover 82. Cover 82 is fixed to the main housing 2 by a plurality of bolts 84. A gasket 86 is placed between the body section 12 and cover 82 to prevent the operating fluid from leaking out of said pump. Gear 80, which is the driving gear, is keyed to an extension 88 of driving shaft 22 by a key 90. Gear 78, which meshes with gear 80, is rotatably mounted by a plain bearing 94 on a pin 92, which is fixed between the cover 82 and body section 12.

Pressure relief by-pass valve 75 includes a valve seat 96 and cooperating valve member 98. Valve member 98 is guided by a rod 100 fixed thereto which extends through a bore 102 in an insert 104. Insert 104 is threadably secured to passageway 74 in an internally threaded boss 106. A spring 108 is positioned around said rod 100 and a portion 101 of insert 104 which projects into conduit 74, between a spring seat 110 on the downstream side of valve member 98 and a spring seat 112 in said insert to bias valve member 98 in a closing direction toward seat 96. A cap 114 is threadably mounted on the end of boss 106 which is also externally threaded.

The force which spring 108 exerts on valve member 96 in moving it to a closed direction is determined by the position of insert 104. The position of this insert may be varied to change the force of the spring acting upon valve member 98.

The nozzle assembly 10 comprises a chamber 116, a regulating valve 118, and a nozzle device 120. Valve 118 includes a valve seat 122, which is located between passageway 72 and chamber 116, and a cooperating valve member 124. Valve member 124 is guided by a rod 126. Rod 126 is threaded at 128 to engage threads 130 of boss 132 to also provide the means for actuating said valve member. The upper portion of rod 126 is smooth as at 138 and extends out of boss 132 through a cap 140 which is threadably mounted on boss 132 at 142. A seal 144 is placed between the cap 140 and boss 132 around the smooth portion of 138 of rod 126 to prevent the actuating fluid from leaking out of chamber 116. A handle 146 is fixed to the free end of rod 126 to facilitate the opening and closing of the valve 118. It can be seen that as the rod 126 is rotated in one direction, the valve member 124 will move in an opening direction, and as the rod 126 is moved in the other direction the valve member 124 will move in a closing direction. While this valve is shown as being manually operated, it is to be remembered that this valve may be automatically operated, for example, as by a two-directional motor being responsive to the speed of shaft 6 for maintaining said speed at a predetermined value, or as by a speed responsive governor.

A multiple nozzle 120 is fixed to the interior of housing 2 and connected to chamber 116 by passage 148. Nozzle device 120 is shown as a multiple nozzle having a plurality of nozzle orifices or jets 150. Each nozzle orifice is positioned so that the operating fluid is directed to the overlapping portions of wheels 32 and 54. The axis of the nozzle 120 as viewed in Fig. 2 is shown at right angles to a line drawn through the center of wheels 32 and 54 and on a line passing through a point J located midway between the outer edges of the overlapping portions of flanges 36 and 58.

Operation

A driving mechanism, not shown, starts rotating driving shaft 22 which in turn rotates the driving assembly. This action rotates the driving wheel 32 and operates the pump assembly for starting the pump 66. As the pump 66 is started, the actuating fluid in the sump 68 is withdrawn from the tank through passageway 70 to the inlet of the pump. The actuating fluid is then delivered out of the pump 66 into passageway 72. Relief valve 75 then functions to prevent the pressure in passageway 72 from exceeding a predetermined value as set by spring 108. The fluid then passes from passageway 72 into chamber 116 through regulating valve 118. The actuating fluid is then directed into nozzle 120 which has a plurality of nozzle orifices or jets which direct the operating fluid to the overlapping portions of wheels 32 and 54. The oil is returned to the sump 68 by passageway 76 which connects the interior of housing 2 to said sump. The actuating fluid directed into the overlapping portions of wheels 32 and 54 fills the space between the flanges of the driving wheel and the sides of the flange on the driven wheel. Any difference in linear velocity between the driving and the driven wheel must shear the oil in the small clearance over the overlapping area. Consequently, as the viscosity of the oil will resist this shear, one wheel will drive the other. The amount of ship between the driving and the driven wheel will depend on the amount of oil maintained in the space between overlapping portions of the two wheels which can be controlled by valve 118.

Although a specific transmission device has been shown and described herein for the purpose of illustration, it will be evident to those skilled in the art that the invention is capable of various modifications and adaptations within the scope of the appended claims.

I claim:

1. A transmission comprising a driving and a driven shaft, said shafts being spaced apart, a wheel having circumferential grooves and flanges drivably mounted on said driving shaft, a wheel having circumferential grooves and flanges drivably mounted on said driven shaft, said wheels so placed that the flanges of the driving wheel project into the grooves of the driven wheel, the flanges on both wheels being spaced from the wheel into which they project, a nozzle mounted so as to inject fluid under high pressure into the meshing grooves and flanges, and fluid supply means to supply fluid to said nozzle including a high pressure pump having its outlet connected to said nozzle.

2. A transmission comprising a driving and a driven shaft, said shafts being spaced apart, a wheel having circumferential spaced flanges drivably mounted on said driving shaft, a wheel having circumferential spaced flanges drivably mounted on said driven shaft, said wheels so placed that the flanges of the driving wheel project between the flanges of the driven wheel, a nozzle assembly mounted so as to inject fluid into the meshing flanges, and fluid supply means to supply fluid to said assembly, said nozzle assembly comprising a regulating valve and a nozzle.

3. A transmission comprising a driving and a driven shaft, said shafts being spaced apart, a wheel having circumferential spaced flanges drivably mounted on said driving shaft, a wheel having circumferential spaced flanges drivably mounted on said driven shaft, said wheels so placed that the flanges of the driving wheel project between the flanges of the driven wheel, a nozzle assembly mounted so as to inject fluid into the meshing flanges, and fluid supply means to supply fluid to said assembly, said nozzle assembly comprising a regulating valve and a nozzle, said nozzle having an axis normal to a line passing between the center of each of said shafts, said axis also passing through a point located within the overlapping portions of said spaced flanges of both shafts.

4. A transmission comprising a driving and a driven shaft, said shafts being spaced apart, a wheel having circumferential spaced flanges drivably mounted on said driving shaft, a wheel having circumferential spaced flanges drivably mounted on said driven shaft, said wheels so placed that the flanges of the driving wheel project between the flanges of the driven wheel, a nozzle assembly mounted so as to inject fluid into the meshing flanges normal to a line passing between the center of each of said shafts, and fluid supply means to supply fluid to said assembly, said nozzle assembly comprising a regulating valve and a nozzle, said fluid supply means having a conduit for supplying an operating fluid to said regulating valve, said fluid passing through said regulating valve to said nozzle, said fluid supply means having a pump for pumping an operating fluid into said conduit, means for driving said pump only when said driving shaft is rotating.

5. A transmission comprising a driving and a driven shaft, a wheel having circumferential spaced flanges drivably mounted on said driving shaft, a wheel having circumferential spaced flanges drivably mounted on said driven shaft, said wheels so placed that the flanges of the driving wheel project between the flanges of the driven wheel, a nozzle assembly mounted so as to inject fluid into the meshing flanges normal to a line passing between the center of each of said shafts, and fluid supply means to supply fluid to said assembly, said nozzle assembly comprising a regulating valve and a nozzle, said fluid supply means having a conduit for supplying an operating fluid to said regulating valve, said regulating valve controlling the fluid passing therethrough to said nozzle, said fluid supply means having a pump for pumping an operating fluid into said conduit, said fluid supply means having a pressure relief by-pass valve connected to said conduit.

6. A transmission unit having a housing, a driving shaft, a driven shaft, said driving shaft having one end fixed for rotation in said housing, said driven shaft having one end fixed for rotation in said housing, circular flanges being drivably connected to said driving shaft, circular flanges being drivably connected to said driven shaft, each flange of said driving member extending between a pair of flanges on said driven shaft, a nozzle mounted so as to inject fluid into the meshing flanges, a regulating valve, a sump, a first conduit connecting said housing to said sump, a pump, a second conduit connecting said pump to said sump, a third conduit connecting said pump to said nozzle, said regulating valve located in said third conduit providing a variable restriction therein, a fourth conduit connecting said third conduit to said sump, a pressure relief by-pass valve located in said fourth conduit between said third conduit and said sump.

7. A transmission comprising a housing, a driving and a driven shaft mounted for rotation on said housing, said shafts having their axes spaced apart, circumferential spaced flanges mounted on said driving shaft, the inner periphery of said flanges being fixed to said driving shaft, circumferential spaced flanges mounted on said driven shaft, the inner periphery of said flanges being fixed to said driven shaft, the flanges of one shaft projecting between the flanges of the other shaft, a nozzle mounted on said housing so as to inject fluid under high pressure into the meshing flanges, and fluid supply means to supply fluid to said nozzle including a high pressure fluid pump having its outlet connected to said nozzle.

8. A transmission comprising a housing, a driving and a driven shaft mounted for rotation on said housing, said shafts having their axes spaced apart, circumferential spaced flanges mounted on said driving shaft, the inner periphery of said flanges being fixed to said driving shaft, circumferential spaced flanges mounted on said driven shaft, the inner periphery of said flanges being fixed to said driven shaft, the flanges of one shaft projecting between the flanges of the other shaft, a nozzle assembly mounted on said housing so as to inject fluid into the meshing flanges normal to a line passing between the center of each of said shafts, and fluid supply means to supply fluid to said assembly, said nozzle assembly comprising a regulating valve and a nozzle, said fluid supply means having a conduit for supplying an operating fluid to said regulating valve, said regulating valve controlling the fluid passing to said nozzle.

References Cited in the file of this patent

UNITED STATES PATENTS

| | | |
|---|---|---|
| 1,025,547 | Sundh | May 7, 1912 |
| 1,127,313 | Sundh | Feb. 2, 1915 |
| 1,293,310 | Bennett | Feb. 4, 1919 |
| 2,576,156 | Trofimov | Nov. 27, 1951 |
| 2,640,364 | Nelson | June 2, 1953 |

FOREIGN PATENTS

| | | |
|---|---|---|
| 689,615 | Great Britain | Apr. 1, 1953 |